United States Patent
Kumar et al.

(10) Patent No.: US 6,529,119 B1
(45) Date of Patent: Mar. 4, 2003

(54) ESTABLISHMENT OF COMMUNICATIONS WITH A SELECTED DEVICE IN A MULTI-DEVICE ENVIRONMENT

(75) Inventors: Mohan Kumar, Beaverton, OR (US); Rajiv Choudhary, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/141,858

(22) Filed: Aug. 28, 1998

(51) Int. Cl.[7] ................................................ H04Q 5/22
(52) U.S. Cl. ................. 340/10.2; 340/825.08; 340/825.1; 370/449; 370/338; 370/312; 370/346; 370/348; 370/432; 455/463; 455/464
(58) Field of Search .................. 370/449, 338, 370/312, 346, 348, 432, 332; 340/825.08, 825.1, 10.2; 455/463, 464

(56) References Cited

U.S. PATENT DOCUMENTS 5,530,963 A * 6/1996 Moore et al. .......... 395/200.15
5,949,777 A * 9/1999 Uyesugi et al. ............. 370/345

* cited by examiner

Primary Examiner—Michael Horabik
Assistant Examiner—M Shimizu
(74) Attorney, Agent, or Firm—Kenyon & Kenyon

(57) ABSTRACT

A method and apparatus are described that allows a wireless device to detect and initiate communications with a selected second wireless device in a multi-device environment. Initiation of communications with a chosen second device is accomplished by generating a list of all available devices in sequential order according to device identifier and then communicating with each device in a sequential fashion until communications have been established with the selected second device.

31 Claims, 10 Drawing Sheets

Architecture of Message Frame

MAC Frame 500

Step 810 - Host issues enumeration hail

| Source | HADD | CNTL | PADD | DATA |
|--------|------|------|------|------|
| Host | Host Addr | 0x9 | 0xF | Host ID+Host Info |

510  530  520  540  500

Step 820 - Peripheral responds with its PFID

| Source | HADD | CNTL | PADD | DATA |
|--------|------|------|------|------|
| Peripheral | Host Addr | 0x4 | 0xF | PFID+Peripheral Info+Host ID |

510  530  520  540  500

Step 830 - Host stores PFID and responds with received PFID

| Source | HADD | CNTL | PADD | DATA |
|--------|------|------|------|------|
| Host | Host Addr | 0x8 | 0xF | PFID |

ESTABLISHMENT OF COMMUNICATIONS WITH A SELECTED DEVICE IN A MULTI-DEVICE ENVIRONMENT

FIELD OF THE INVENTION

The present invention relates generally to communication between wireless devices. In particular, the present invention is directed to a method and system that allows one wireless device to establish a communication channel with a selected second wireless device.

BACKGROUND OF THE INVENTION

It is often necessary for electronic devices to communicate with one another in order to exchange data or to provide a centralized control mechanism for the operation of the devices within a particular environment. Typically, electronic devices communicate using an apparatus known as a "bus" or "data bus". Although a bus typically consists of a wired communications channel physically connecting devices, it is also possible to construct a bus using a wireless ("tetherless") communications channel. A wireless communications channel or a wireless bus offers significant advantages by eliminating the physical interconnect between devices.

In order to permit efficient device communication, it is necessary to establish a communications protocol. A communications protocol is a system for the exchange of information between devices and defines a particular communications architecture. For example, communicating devices are often configured in a host/peripheral relationship or a peer/peer relationship. In the host/peripheral arrangement, a host device typically communicates with one or more peripheral devices. A host periodically collects information from its peripherals or sends control information to the peripherals. The process in which a host collects information from its peripherals is known as polling. The host dictates the polling communication sequence with its connected peripheral devices by determining when each peripheral device may "talk" to the host. Under the polling process, unless the host sends permission to a peripheral device, the peripheral cannot send data to the host. The host/peripheral protocol is often referred to as an asymmetric protocol insofar as the host controls the peripherals' communication abilities.

A typical example of a host/peripheral arrangement is a personal computer (PC) and its various peripheral devices. The host PC is responsible for orchestrating the exchange of data with its peripheral devices and periodically polls all of its peripherals in order to receive data regarding their current state. For example, a host PC will periodically poll its input devices such as the mouse and keyboard to detect events such as mouse movement or the press of key on the keyboard. Upon being polled, these input devices will transmit information regarding their current state to the host PC.

In the case of peer to peer communication, the communication protocol is symmetric in that neither peer device controls the other and communication can be initiated by either device at any time. For example, two host computing systems as peers may need to exchange data over a wireless communications channel.

Before communication may begin between two devices, they must establish a communication channel. Establishment of a communication channel requires that devices recognize each other and initiate communication. A device may communicate with multiple devices simultaneously or only one device at a time. For example, in a host/peripheral environment, a host typically communicates with a plurality of wireless peripheral devices simultaneously using some type of multiplexing scheme. However, each peripheral device generally "talks" to one and only one host device at a time.

In traditional wireless device communications systems there exists no mechanism to direct one device to establish communications with a particular second device. For example, in a multi-host environment, a peripheral will typically establish communications with the host providing the strongest signal or to the first host to initiate communications with the peripheral. However, many scenarios require the flexibility of directing a wireless device to select a particular second device for communications. Lack of this functionality severely limits the performance of wireless device communications systems.

SUMMARY OF THE INVENTION

The present invention comprises a method and apparatus that allows a first wireless device to establish communications with a selected second wireless device in a multi-device environment. The selection of the second device may be accomplished either through user input or automatically by a procedure implemented on the first device. According to one embodiment of the present invention, the first device stores a device identifier of the device with which it is currently communicating as well as a device identifier of the new device with which communication is sought. Upon the initiation of the process, the first device performs a scan procedure in which it detects and records the device identifiers of all devices in its range available for communications. Starting with the device holding the device identifier succeeding the device identifier of the current communicating device, the first device sequentially initiates communication with each succeeding device until it has established communications with the device holding the selected device identifier.

BRIEF DESCRIPTION OF THE DRAWINGS

FIG. 8 further depicts the content of messages exchanged between a host device and a peripheral device during an enumeration procedure.

DETAILED DESCRIPTION

Figure 1:
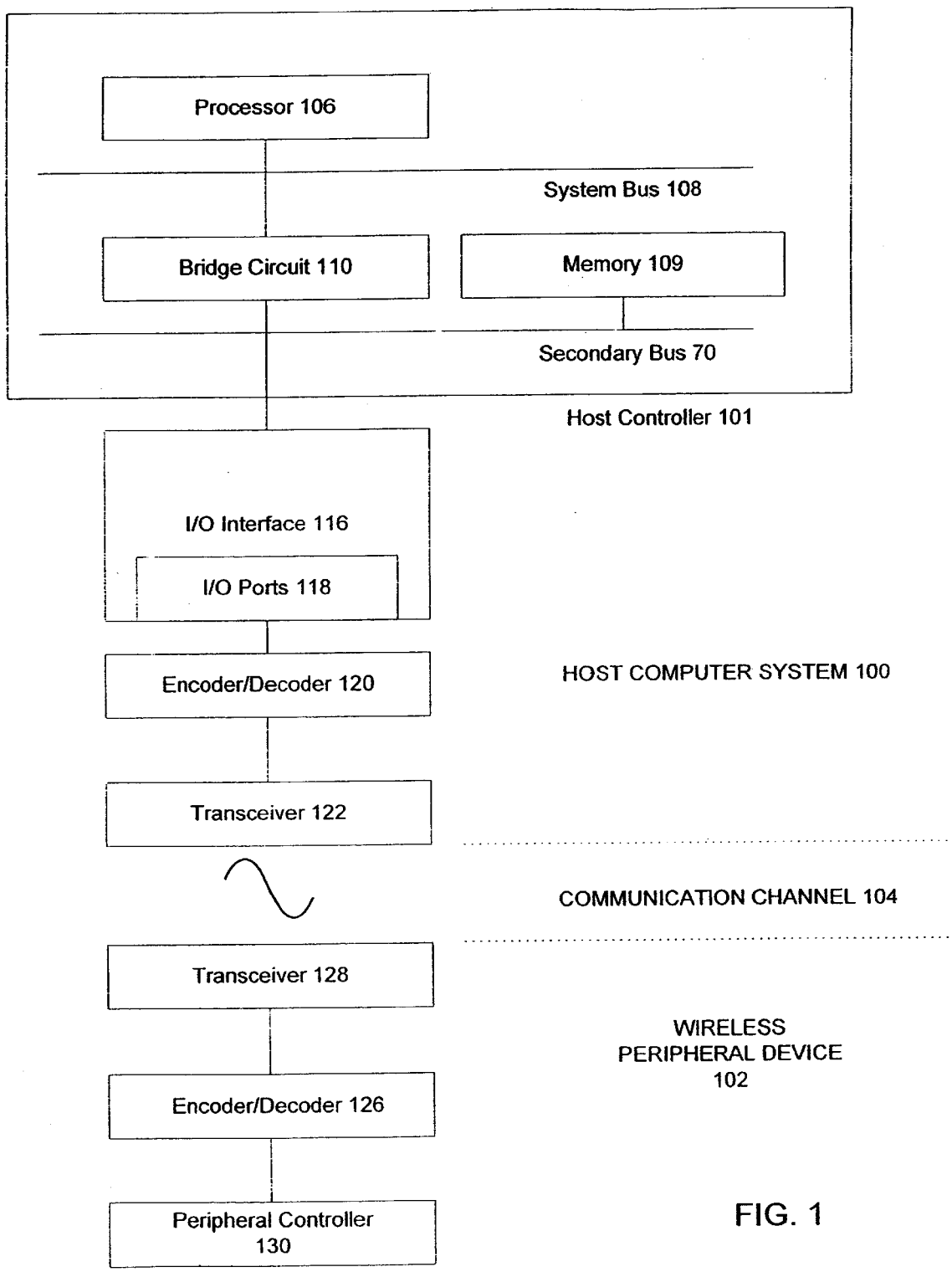
FIG. 1 is a functional block diagram depicting a host computer and wireless peripheral device according to one embodiment of the present invention.

A method and apparatus are described that allow a first device to initiate communications with a selected second device. For illustrative purposes herein, the discussion herein describes one embodiment of the present invention in accordance with the wireless device communication environment and protocol specified in the "Infrared Bus (IRBus) Specification," version 1.0d, February 1998 (the "IRBus embodiment"). This is solely by way of example and for purposes of explanation, and is not intended to limit the scope of the claims appended hereto.

In particular, in accordance with the IRBus specification, the embodiment described herein pertains to wireless peripherals having IR transceivers and host computing devices supporting IR transceiver modules. This is solely by way of example and for the purposes of explanation, and is not intended to limit the scope of the claims appended hereto. Embodiments of the present invention can be used with a variety of wireless peripheral device technologies, including, for example, high frequency (HF), radio frequency (RF) as well as the infrared (IR) peripherals described herein.

Further, for illustrative purposes only, in accordance with the IRBus specification, the embodiment discussed herein pertains to a host/peripheral device architecture. In the context of the present invention, the embodiment described herein is a mechanism that allows a peripheral to establish communications with a selected host. This is solely by way of example and for purposes of explanation, and is not intended to limit the scope of the claims appended hereto. Alternative embodiments of the present invention are not limited to the host/peripheral framework. For example, the present invention could be applied to the establishment of communications between two PC's operating as peer devices in which one peer device establishes communications with a selected second peer device.

In a typical scenario illustrating the application of the present invention, a peripheral device has established a communications channel with a host device. It is desired to direct the peripheral device to establish communications with a different host device. In order to identify host and peripheral devices, an identification system is established in which each host and each peripheral are assigned an identifier (typically a transiently unique number or address). The peripheral device stores a device identifier of the host with which it is currently communicating.

For illustrative purposes only, the embodiment of the present invention described herein utilizes an automated method for a peripheral device to establish communications with a selected host. In this embodiment, a peripheral stores a device identifier of a host with which communication is sought. The peripheral then scans for all available hosts in its range and constructs an ordered list of all available hosts (ordered by host identifier). Starting with the host it is currently communicating with, the peripheral automatically cycles through all hosts in the ordered list (establishing communication with each in turn) until it detects that it has established communications with the selected host (i.e. it has established communications with the host holding the device identifier of the host with which communication is sought). This automated method for establishing communications with a selected host is solely by way of example and for purposes of explanation, and is not intended to limit the scope of the claims appended hereto.

The need for this automatic method of device communications might arise when a peripheral device needs to send data to multiple host devices at different times. Thus, at time 1, the peripheral device might need to report its state to host device A, while at time 2 the peripheral device might need to report its state to host device B. In this case, the peripheral device would need to automatically establish communications with different host devices at different times in order to send data.

The present invention is also compatible with alternative embodiments in which the establishment of communications with a selected host, for example, might be effected through manual input by the user or some other means. According to one alternative embodiment employing a manual selection method, a user directly controls the peripheral's process of establishing communications with a selected host. The user directs the peripheral to initiate communications with new host devices by, for example, pressing a "scan button" on the peripheral device. Each press of the scan button causes the peripheral device to establish communications with the host holding the device identifier succeeding the identifier of the current communicating host. The user then can direct the establishment of communications with the desired host by pressing the scan button one or multiple times until the peripheral device has established communications with the desired host.

For example, the manual selection of a host might involve the control of a multitude of wireless peripherals through one wireless remote control. In a typical scenario, a user might desire centralized control of consumer devices such as VCR's, televisions, stereo equipment etc. These host devices would receive commands from a remote control peripheral device over a wireless link. The operator of the remote control might desire to send control commands to the CD player at one time. At a later time, the user might desire to send commands to the television, for example, to change the channel. In this multi-host environment it would be necessary to provide a method to allow the remote control peripheral device to establish communications with a particular host device (VCR, television) at any time. Typically, each of these host devices would be associated with a particular identifier. The user could press a button on the remote control unit that runs a procedure incorporating the present invention which causes the remote control to initiate communications with a new host device (typically the host device holding the device identifier succeeding the device identifier of the current communicating host). The user could control the selection of a host by pressing the scan button until the peripheral has initiated communications with a desired host.

FIG. 1 shows a host computer system 100 coupled to a wireless peripheral device 102 through a communication channel 104 in accordance with one embodiment of the invention. Computer system 100 includes a processor 106 coupled to a system bus 108 and, through bridge circuit 110, to secondary bus 70 and memory 109.

The host 100 can be, for example, a personal computer (PC), a high definition television (HDTV) system or a computer controlled home appliance. Illustrative wireless peripheral devices (e.g., 102) include wireless keyboards, wireless mice (or other wireless pointing devices), wireless control consoles, wireless game-pads and wireless joysticks. Representative processors (e.g., 106) include the PENTIUM® family of processors and the 80×86 families of processors from Intel Corporation, Santa Clara, Calif. Illustrative bridge circuits (e.g., 110) include the 82443LX PCI (Peripheral Component Interface)-to-AGP (Advanced Graphics Port) and 82371AB PCI-to-ISA/IDE controllers made by Intel Corporation. System bus 108 may, for example, be an Intel PENTIUM® PRO bus. (See the "PENTIUM® Pro Processor Specification," update release May 1998.) Illustrative secondary buses (e.g., 70), include the universal serial bus and peripheral component interface buses. (See the "Universal Serial Bus (USB) Specification," revision 1.0, January 1996; and the "Peripheral Component Interface (PCI) Specification," revision 2.1S.) Memory 109 may include ROM, RAM, semiconductor memory devices such as EPROM (Erasable Programmable Read Only Memory), EEPROM (Electronically Erasable Programmable Read Only Memory) and flash devices (collectively nonvolatile RAM or NVRAM), magnetic disks (fixed, floppy, and removable), other magnetic media such as tape, optical media such as CD-ROM (Compact Disk Rom) disks, or combinations of these memories.

Within computer system 100, communication channel 104 is controlled by input-output (I/O) interface 116. I/O interface 116 includes I/O ports 118 through which communication signals to and from individual wireless peripheral devices pass (only one such peripheral device is shown in FIG. 1). Information sent from computer system 100 to peripheral device 102 passes through I/O interface 116, is encoded by encoder/decoder 120, and injected into communication channel 104 by transceiver 122. Information received by computer system 100 from peripheral device 102 is received by transceiver 122, decoded by encoder/decoder 120, passed through I/O interface 116 and routed to processor 106 via bridge circuit 110.

Within peripheral device 102, a controller 130 controls communication to and from computer system 100. As in host computer system 100, encoder/decoder 126 encodes and decodes information and transceiver 128 transmits and receives signals to/from host computer system 100 by way of communication channel 104.

Figure 2:
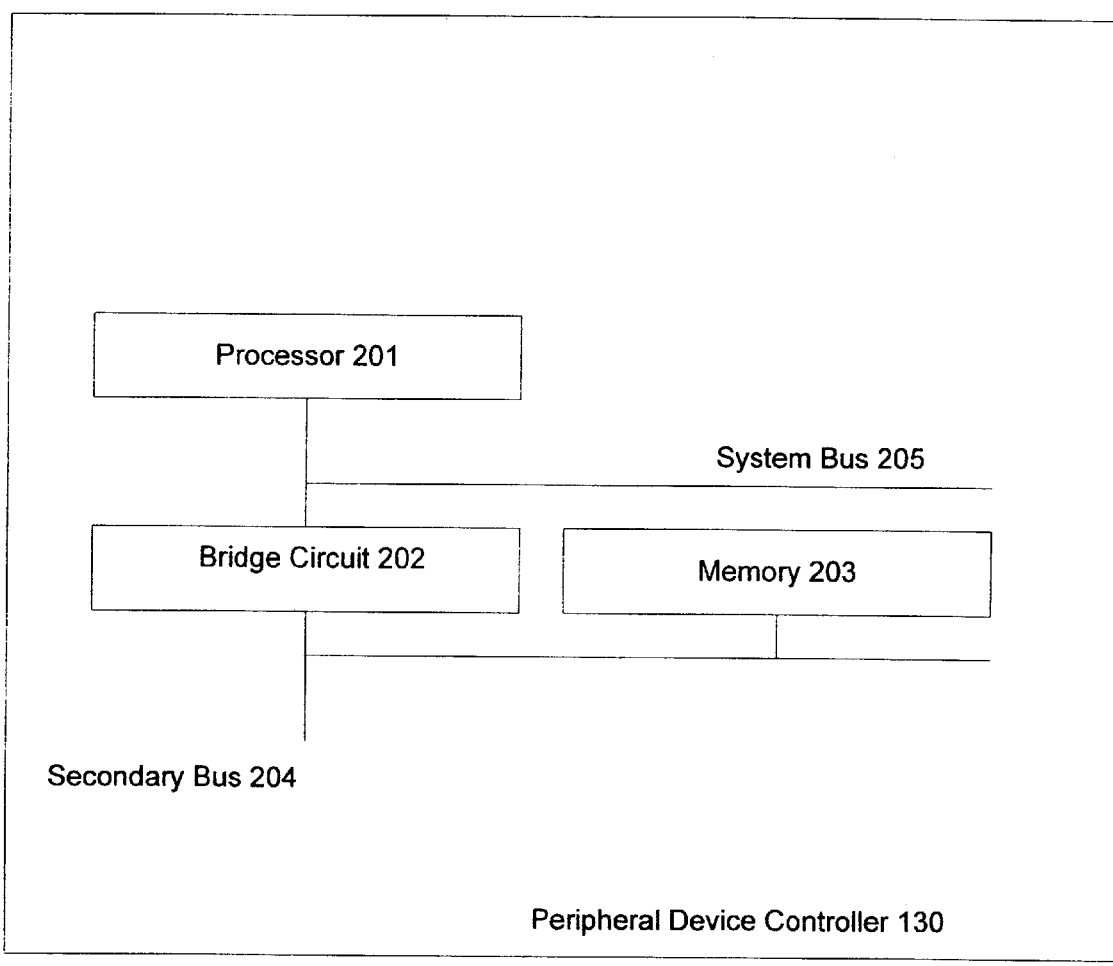
FIG. 2 is a functional block diagram depicting the device controller architecture for a wireless peripheral device according to one embodiment of the present invention.

Within the wireless peripheral device 102, a peripheral controller 130 controls communication to and from the host 100. FIG. 2 depicts the architecture of a peripheral controller 130 according to one embodiment of the present invention. Peripheral controller 130 includes a processor 201 coupled to a system bus 205 and, through bridge circuit 202, to secondary bus 204 and memory 203. Representative processors (e.g., 201) include the PENTIUM® family of processors and the 80×86 families of processors from Intel Corporation. Illustrative bridge circuits (e.g., 202) include the 82443LX PCI-to-AGP and 82371AB PCI-to-ISA/IDE controllers made by Intel Corporation. System bus 205 may, for example, be an Intel PENTIUM® PRO bus. (See the "PENTIUM® Pro Processor Specification," update release May 1998.) Illustrative secondary buses (e.g., 204), include the universal serial bus and peripheral component interface buses. (See the "Universal Serial Bus (USB) Specification," revision 1.0, January 1996; and the "Peripheral Component Interface (PCI) Specification," revision 2.1S.) Memory 203 may include read only memory (ROM), random access memory (RAM), semiconductor memory devices such as EPROM, EEPROM and flash devices (collectively nonvolatile RAM or NVRAM), magnetic disks (fixed, floppy, and removable), other magnetic media such as tape, optical media such as CD-ROM disks, or combinations of these memories.

The embodiment of the present invention described herein comprises a distinct two stage process as delineated in the IRBus Specification ("enumeration" and "binding") for the establishment of communications between a host device 100 and a peripheral device 102. This is solely by way of example and for purpose of explanation, and is not intended to limit the scope of claims appended hereto. The present invention can be used with any number of schemes for the establishment of communications between devices and the enumeration/binding process described herein merely represents one illustrative example of a protocol for the establishment of communications between wireless devices.

According to this embodiment, in the first phase, "enumeration", host computer system 100 discovers or detects the presence of peripheral device 102, peripheral device 102 discovers or detects the presence of host device 100 and the two exchange address and identification information. The term enumeration is borrowed from the context of data bus protocol and describes a process where a host computer recognizes and accounts for all peripheral devices connected on the bus. Upon the initiation of communication between a peripheral device on a bus and the host device, that peripheral device is said to be "enumerated" to the host device. The term "enumeration" can also be applied by analogy in the context of wireless device communications in which wireless peripheral devices become enumerated to a particular host. However, as noted above, the enumeration process described herein only represents one embodiment of a protocol for the establishment of communication between devices in which present invention may be applied.

In the second phase "binding", an enumerated peripheral 102 is assigned a transiently unique identifier by the host 100 and is added to the host's polling cycle. Once bound, a host 100 and wireless peripherl device 102 may periodically communicate using the peripheral's host-assigned identifier. Once a peripheral 102 has been added to the polling loop, the host 100 periodically "polls" the peripheral 102 to allow the peripheral 102 to send data back to the host 100. Polling is a periodic process in which a host 100 issues a "response permission" for each peripheral 102 to send data.

Figure 3:
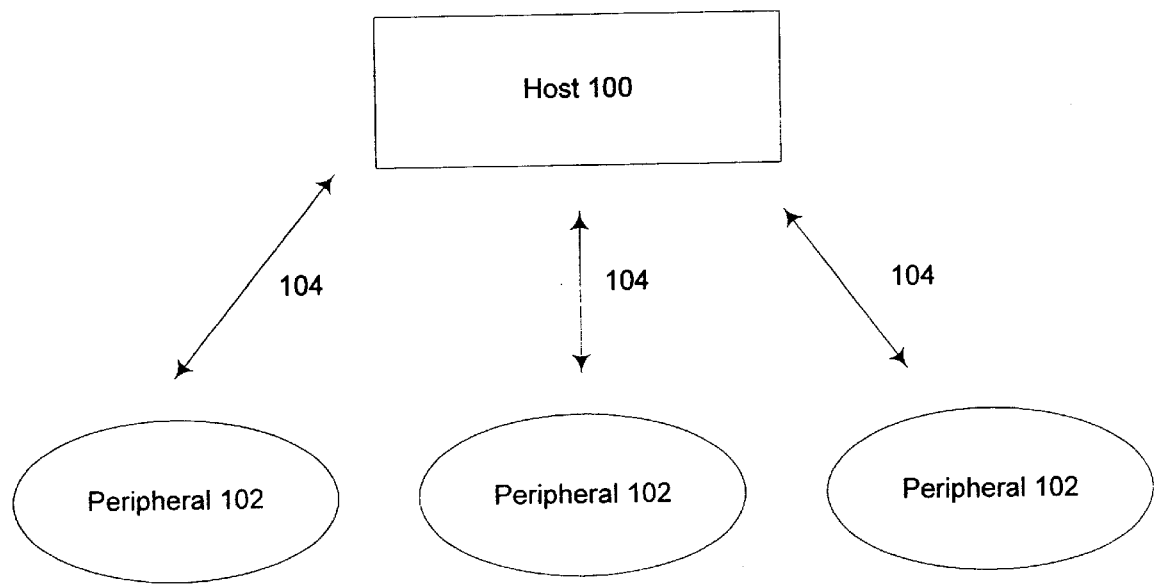
FIG. 3 depicts a host device communicating with a set of peripheral devices.
Figure 4:
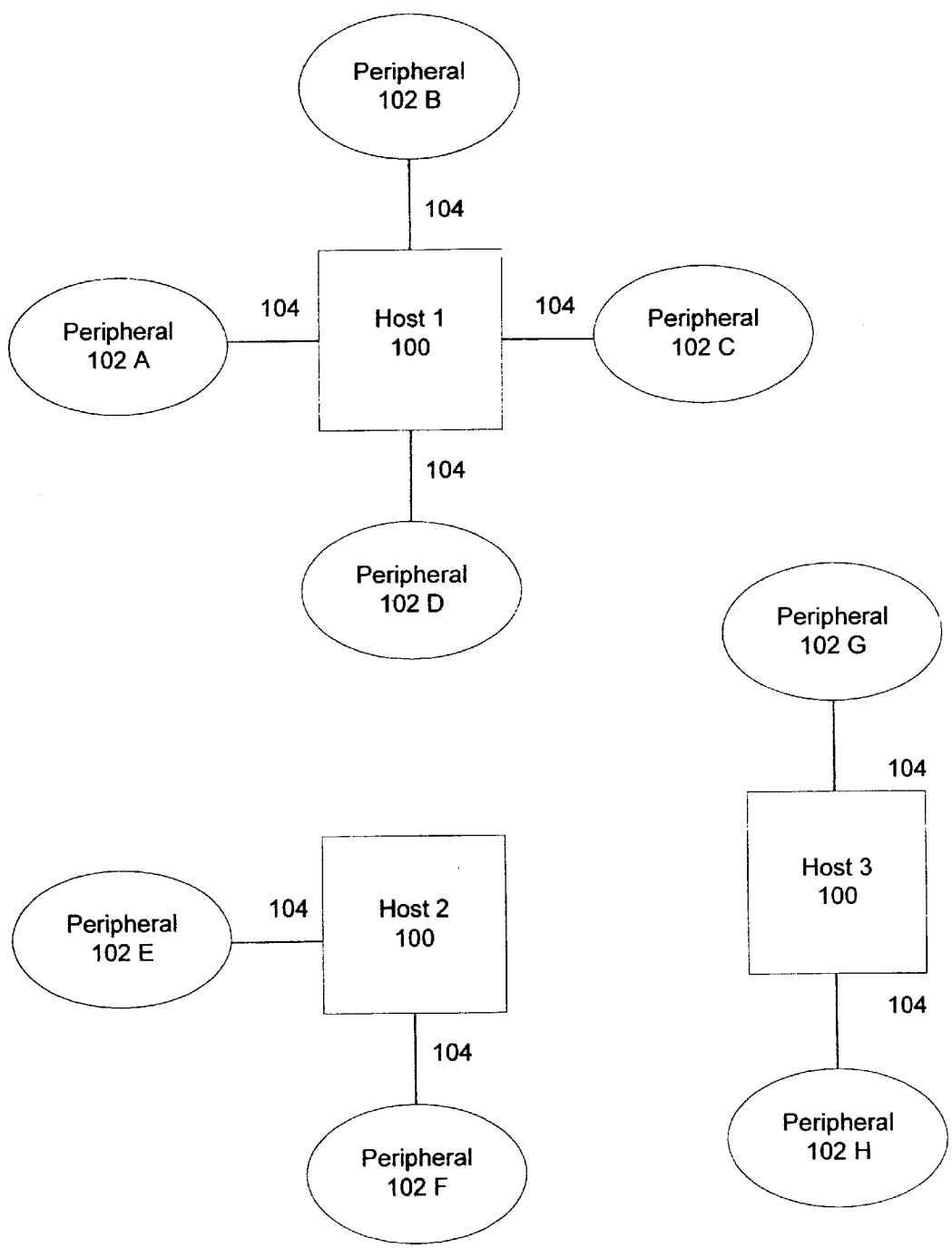
FIG. 4 depicts a multi-host environment.

A particular host 100 may, at any given time, have communication links established with a plurality of wireless peripheral devices 102. That is, the host 100 may be simultaneously bound to a number of wireless peripheral devices 102, with the maximum number being equal to the number of wireless peripheral ports 118 the host 100 is configured to support. FIG. 3 depicts a block diagram of a host 100 bound to a plurality of wireless peripheral devices 102, i.e., a host 100 with communication links 104 established with a plurality of wireless peripheral devices 102. FIG. 4 further depicts a multi-host environment. In this depiction peripherals 102 A, B, C and D are communicating with host 1 (100). Peripherals E and F 102 are enumerated and bound to host 2 (100). Peripherals 102 G and H are enumerated and bound to host 3. In one embodiment of the present invention, a host 100 manages its communication with a plurality of peripherals 102 on a time division basis (poll-response).

Before a particular wireless peripheral device 102 can be used in conjunction with a particular host 100, a communication link must be established between them (i.e. in the context of the embodiment described herein the peripheral 102 must be enumerated to a particular host device 100). Establishment of such a link requires, first, that the host 100 be made aware of the presence of the peripheral 102 within the host's operating environment. In addition, because communication between a host 100 and a wireless peripheral 102 occurs via electromagnetic signals sent through the air rather than through a physical cable connecting the devices, and because there may be other hosts 100 and/or peripherals 102 operating within the signal detection range of the two devices, the host 100 and the wireless peripheral 102 must have a unique means of identifying each other. Such an identification mechanism allows the peripheral 102 to distinguish communication signals sent by the host 100 from signals sent by other hosts 100 that may be operating within the peripheral's signal detection range, and allows the host 100 to distinguish communication signals sent by the peripheral 102 from signals sent by other peripherals 102 operating within the host's signal detection range.

In one embodiment of the present invention, hosts 100 and peripherals 102 are identified by their respective addresses and identifiers. The identification scheme described herein is solely by way of example and for purposes of explanation, and is not intended to limit the scope of the claims appended hereto. Embodiments of the present invention can be used with a any number of identification schemes. According to one embodiment of the present invention, a host 100 is identified by a 16-bit host identifier (HostID). The HostID is a persistent value that, for example, might be stored in non-volatile memory 109 and retrieved during a power-up initialization operation. The host 100 may also be identified by an 8 bit-host address (HADD), which is generated and may change each time the host is powered-up or reset.

According to this embodiment, a peripheral 102 is identified by a 32 bit physical ID (PFID). The PFID may also be a persistent value like the HostID, which is stored in non-volatile memory and retrieved by the peripheral during power-up. A logical 4-bit peripheral address (PADD) may be uniquely assigned to each peripheral 102 by the host 100 to establish "active" communication. This procedure is part of the binding process, which is performed when an enumerated peripheral 102 attempts to establish active communication with the host 100 (i.e. peripheral device enters host's polling cycle). There are two reserved PADD's that signify certain initiation events such as enumeration and binding. Peripheral address "OxF" is used to indicate that a host 100 is hailing for peripherals to become enumerated (i.e. inviting peripherals to establish communications) (HOST_HAIL message) (i.e. during enumeration, the host 100 polls using a peripheral address "OxF"). Peripherals 102 that are not enumerated to a host are allowed to respond to host enumeration hails with a PADD of "OxF" only.

Typically, the ID numbers (HostID/PFID) are used only during the initiation of communication between a host 100 and a peripheral 102 to identify the devices. After this initial identification, hosts/peripherals are identified by their addresses (HADD/PADD). A host 100 and a peripheral 102 must exchange address/ID information (HADD/HostID and PFID) as part of the enumeration process (discussed below). Upon binding of a peripheral 102, a host 100 dynamically maintains the mapping between the 4-bit PADD and the 32 bit physical ID (PFIDs) of the peripherals 102 it has currently bound.

Figure 5:
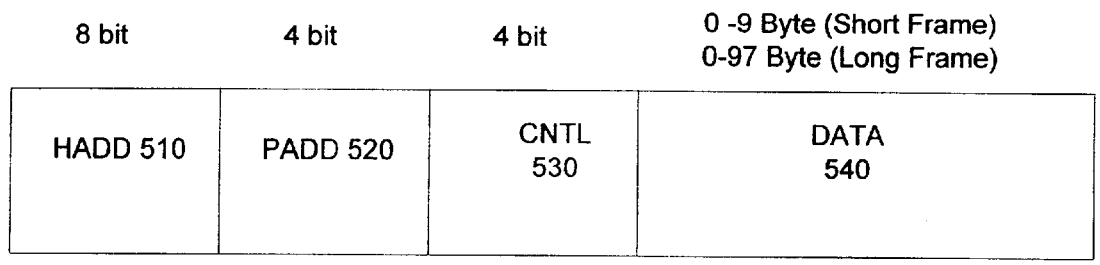
FIG. 5 depicts a message data structure for communication between a host computing device and a wireless peripheral device according to one embodiment of the present invention.

Communication between host 100 and peripheral device 102 may be mediated by a media access control (MAC) message frame structure as shown in FIG. 5. MAC frame 500 may include host address (HADD) field 510, peripheral address (PADD) field 520, control (CNTL) field 530, and data field 540. In one embodiment, designed in accordance with the IRBus specification (see reference above), these fields have the following characteristics. HADD field 510 is an 8-bit host address field which is generated each time host 100 is power-cycled or reset. The HADD value identifies host 100 in all subsequent communication between itself and its wireless peripherals. PADD field 520 is a 4-bit peripheral address field that is generated and assigned to peripheral device 102 during the enumeration process by host 100. Once generated, the PADD value identifies peripheral device 102 in all subsequent communications between itself and its host. Control field 530 is a 4-bit field that identifies the type of message being transmitted (e.g., a message from host 100 to peripheral device 102) and thus the nature of the information included in the message's data field 540. Data field 540 is a variable length field (e.g., zero to 97 bytes) that carries the data being transferred between host 100 and peripheral device 102.

The CNTL field 530 is a 4-bit field used to send control information between hosts 100 and peripherals 102. The meanings of each bit in the CNTL field 530 are dependent on whether the frame is sent from a host 100 to a peripheral 102 or from a peripheral 102 to a host 100. With respect to the present embodiment, the most important bit is bit D4 of the MAC control field 530 which indicates whether a host 100 is hailing (1=hailing; 0=not hailing).

Figure 6:
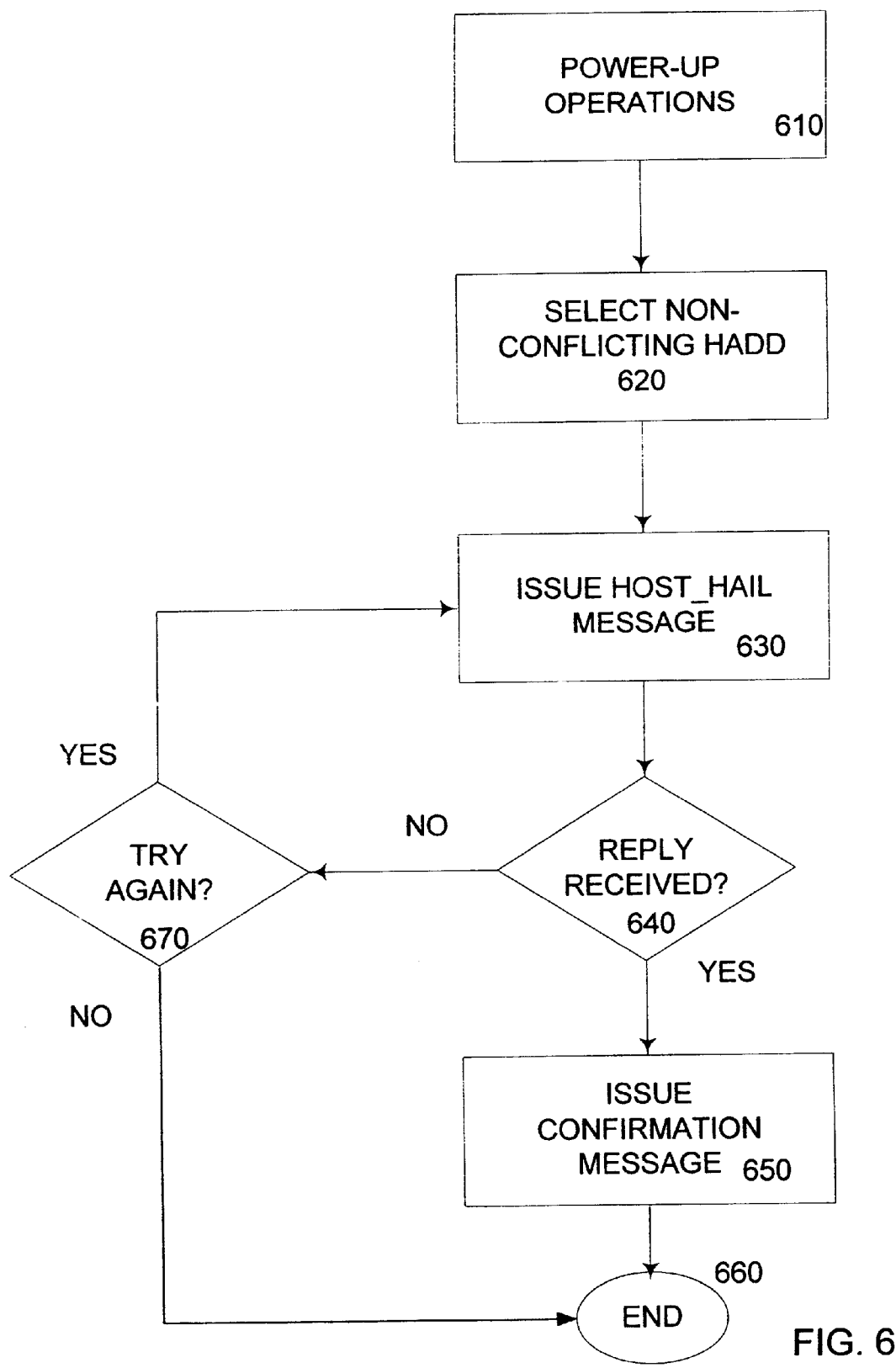
FIG. 6 is a flowchart depicting an enumeration process between a host device and a peripheral device according to one embodiment of the present invention.

An enumeration process performed by host 100 in accordance with one embodiment of the invention is shown in FIG. 6. At some initial time, host 100 begins power-up reset operations during which it determines its HostID value (step 610). For example, host 100 may store its HostID value in memory 114 (FIG. 1) so that, during start up, this value may be retrieved. In this sense, the HostID value is persistent in that its value is retained from reset/power-cycle operation to reset/power-cycle operation. Next, host 100 generates a HADD value that is distinct from those used by other hosts transmitting within its signal reception area, i.e., its operating environment (step 620). To determine which HADDs are in use, host 100 may listen (via transceiver 122 and encoder/decoder 120) for messages being transmitted to and from other host computer systems within its signal reception area. Once host 100 has determined its HostID and HADD values, it generates a hail message (HOST_HAIL message—also referred to as a broadcast message) indicating it is ready to communicate with wireless peripherals 102 (step 630). In a hail type message, data field 540 may be set to include the host's 100 HostID value.

If a wireless peripheral 102 responds to the host's 100 hail message (the 'yes' branch of step 640), host 100 transmits a message to the replying peripheral confirming that it is now enumerated (step 650). On completion of step 650, enumeration processing terminates (step 660). If no wireless peripheral 102 responds to the host's 100 hail message within a specified time period (the 'no' branch of step 640), host 100 may issue another hail message (the 'yes' branch of step 670) or terminate enumeration processing (the 'no' branch of step 670).

Figure 7:
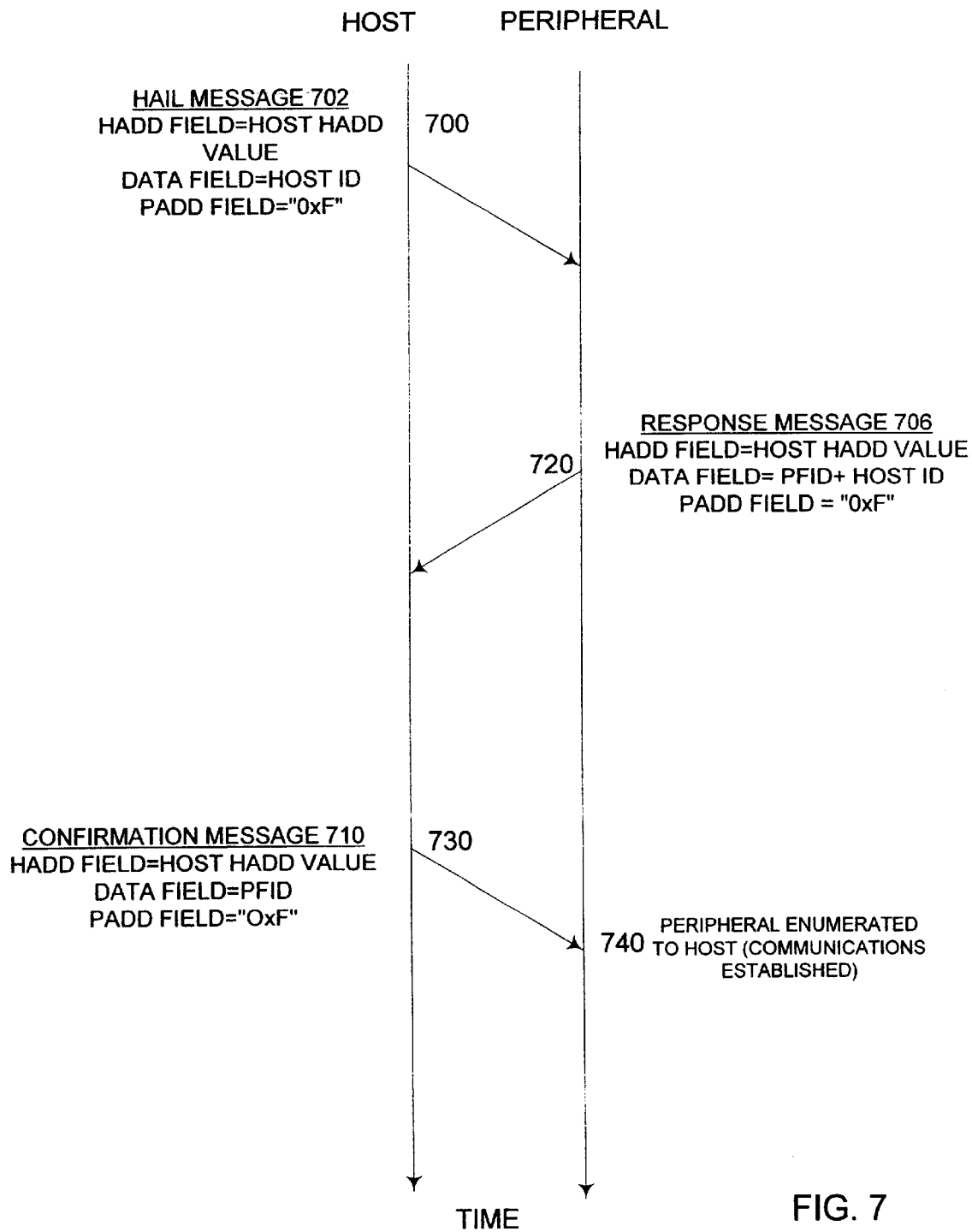
FIG. 7 depicts an example of the timing and content of messages exchanged between a host device and peripheral device during an enumeration procedure.

FIG. 7 shows the messages that may be transferred between host 100 and peripheral device 102 during the enumeration process of FIG. 6 according to one embodiment of the present invention. At time 700 host 100 transmits hail message 702 with HADD field 510 set to the host's HADD value, data field 540 set to include the HostID value and PADD field 520 set to the hailing signifier "OxF". At subsequent time 720, peripheral device 102 responds by transmitting response message 706 with data field 540 set to include the peripheral's PFID and the HostID values. In one embodiment, host 100 may store the peripheral device's PFID in a nonvolatile memory 109 (Thus, the peripheral device's PFID value may be made persistent in the same manner as the HostID value.) At time 730, host 100 transmits confirmation message 710 with HADD field 510 set to the host's 100 HADD value and data field 540 set to include the peripheral's 102 PFID value. When peripheral device 102 receives confirmation message 710 at time 740, peripheral device 102 is said to be enumerated to host 100.

FIG. 8 illustrates the exchange of messages during the enumeration procedure between a host 100 and a peripheral 102 according to one embodiment of the present invention. In step 810, host 100 issues an enumeration hail with the "hailing" bit of the control field 530 set to 1. Host 100 sends a peripheral address of "OxF" in the PADD field to indicate that it is polling peripheral devices 102 for enumeration. The host 100 also sends its HostID as well as other information in the data section of the frame 540.

In step 820, after recognizing the value of "OxF" in the PADD field as an invitation to become enumerated, a peripheral 102 will store the received HADD, the HostID and host information from the data field in variables implemented in computer memory 109. Then, the peripheral 102 that desires enumeration sends a frame back to the polling host 100 with the previously received HADD in the HADD field 510 of the frame. The peripheral 102 stores a value of "Ox4" in the control field 530 to indicate that the direction of the frame is from peripheral 102 to host 100. The peripheral 102 stores its own PFID and received polling HostID in the data field of the frame 540.

In step 830, the host 100, which has received the reply from the peripheral 102 in step 820, stores the PFID in computer memory 109. The host 100 then sends a frame back to the peripheral 102 with the HADD field 510 set to its address. The host 100 sets the control field 530 to the value "Ox8" to indicate that the frame's direction is from host 100 to peripheral 102. Finally, the host sets the data section of the frame 540 to the PFID previously received from the peripheral 102.

Figure 9:
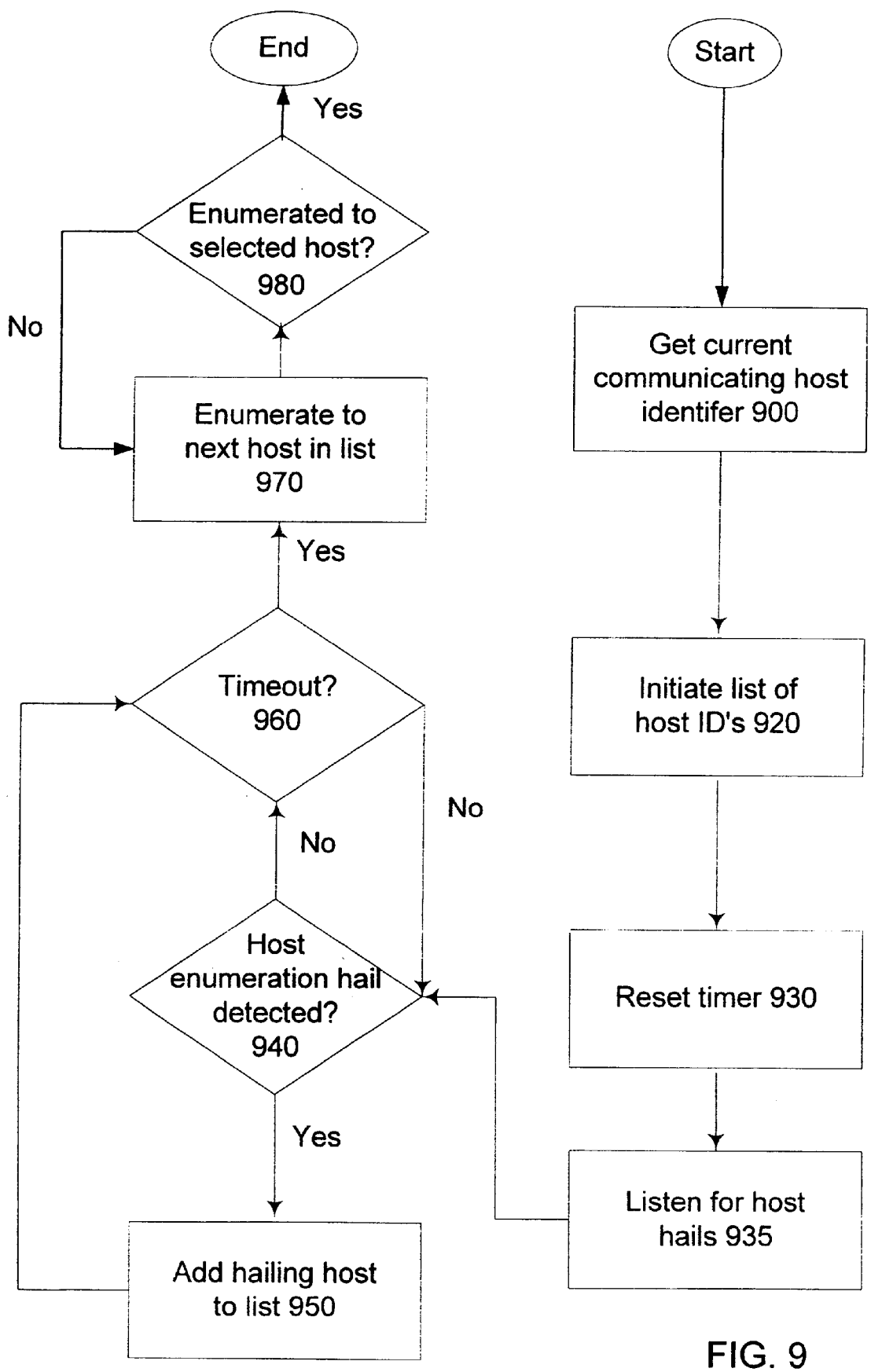
FIG. 9 is a flowchart depicting a procedure for a peripheral device to become enumerated to a selected host device according to one embodiment of the present invention.

Application of the present invention in the context of the enumeration process according to one embodiment of the present invention described herein is shown in FIG. 9. That is, FIG. 9 depicts the steps in which a peripheral device 102 becomes enumerated to a particular host device 100 (i.e. establishes communications with a host 100). This procedure is implemented by the peripheral controller 130, which might for example, be an ASIC (Application Specific Integrated Circuit) specifically designed to implement this algorithm. At the beginning of the sequence (step 900), peripheral 102 retrieves a value from computer memory 109 indicating the HADD of the host 100 to which it is currently enumerated. In addition, the identifier of the selected host is stored as a variable in computer memory.

Peripheral 102 allocates memory and initializes a data structure to store an ordered list of HADD's for all hosts 100 available for enumeration in the range of the peripheral (step 920). This list, might for example, be a linked list with each node containing a pointer variable to the next node in the list. According to one embodiment of the present invention, the list data structure is created according to a modulo scheme (circular structure). This might be implemented, for example, by a circular linked list whereby the last node points back to the first node in the list.

Peripheral 102 then resets and starts a timer procedure to await host hails for a prescribed period of time (step 930). The timer algorithm might be implemented, for example, by keeping track of system time on the peripheral device controller 130. In one embodiment of the present invention, the timer duration is 69 milliseconds.

After the timer is initiated, peripheral 102 begins to listen (via transceiver 128 and encoder/decoder 126) for messages from hosts 100 transmitting within its signal reception area (step 935), i.e., its operating environment. Peripheral 102 then checks to see whether any received messages are from hosts 100 sending an enumeration hail (step 940). An enumeration hail is indicated by the PADD field 520 of the message frame 500 set to value "OxF". If no enumeration hail is detected (the 'no' branch of step 940), peripheral 102 checks to see whether the timer has run (step 960). If the timer has not run (the 'no' branch of step 960), peripheral 102 continues to wait for hailing hosts 100 (step 940).

If an enumeration hail is detected (i.e. PADD field 520 of message frame 500 set to value "OxF") from a host 100 (the 'yes' branch of step 940), the HADD of the hailing host 100 is retrieved from the HADD field 510 of the message frame 500 and inserted in the list of host ID's according to the sequence number of the received HADD. Peripheral 102 then continues to check for new host hails (step 940) until a timeout condition occurs ('yes' branch of step 960).

Once the timer has run ('yes' branch of step 960), peripheral 102 establishes communications with the host 100 in the list with HADD immediately succeeding the HADD of the current communicating host 100. Peripheral 102 then checks to see whether it is enumerated to the selected host 100 by comparing the identifier of the current communicating host with the identifier of the selected host stored in memory (step 980). If peripheral 102 is communicating with the selected host 100 ('yes' branch of step 980) the procedure ends. Otherwise, peripheral establishes communications with the succeeding hosts 100 in the list (step 970) ('no' branch of step 980) until communications have been with the selected host 100.

The following pseudo-code describes an embodiment of the present invention:

Internal Variables

Time, t measured in milliseconds

Linked list 1, an ordered list of host addresses

NextHostAddress, CurrentHostAddress are 8-bit numbers that uniquely specify a host selected host address (HADD), sel Steps 1. do

{

CurrentHostAddress=GetCurrentHostAddress( );// return 0 if peripheral not currently enumerated t=0

InitializeList(1);

do{

Listen for host hails if enumeration hail detected then add host address to ordered list 1;

incrementtime(t);

} while (t<69 ms);

do while peripheral is not enumerated to selected host HADD sel

{

NextHost=ScanListforNextHighestHost(1, CurrentHostAddress);

return NextHost;

Enumerate to NextHost;

}

}

Figure 10:
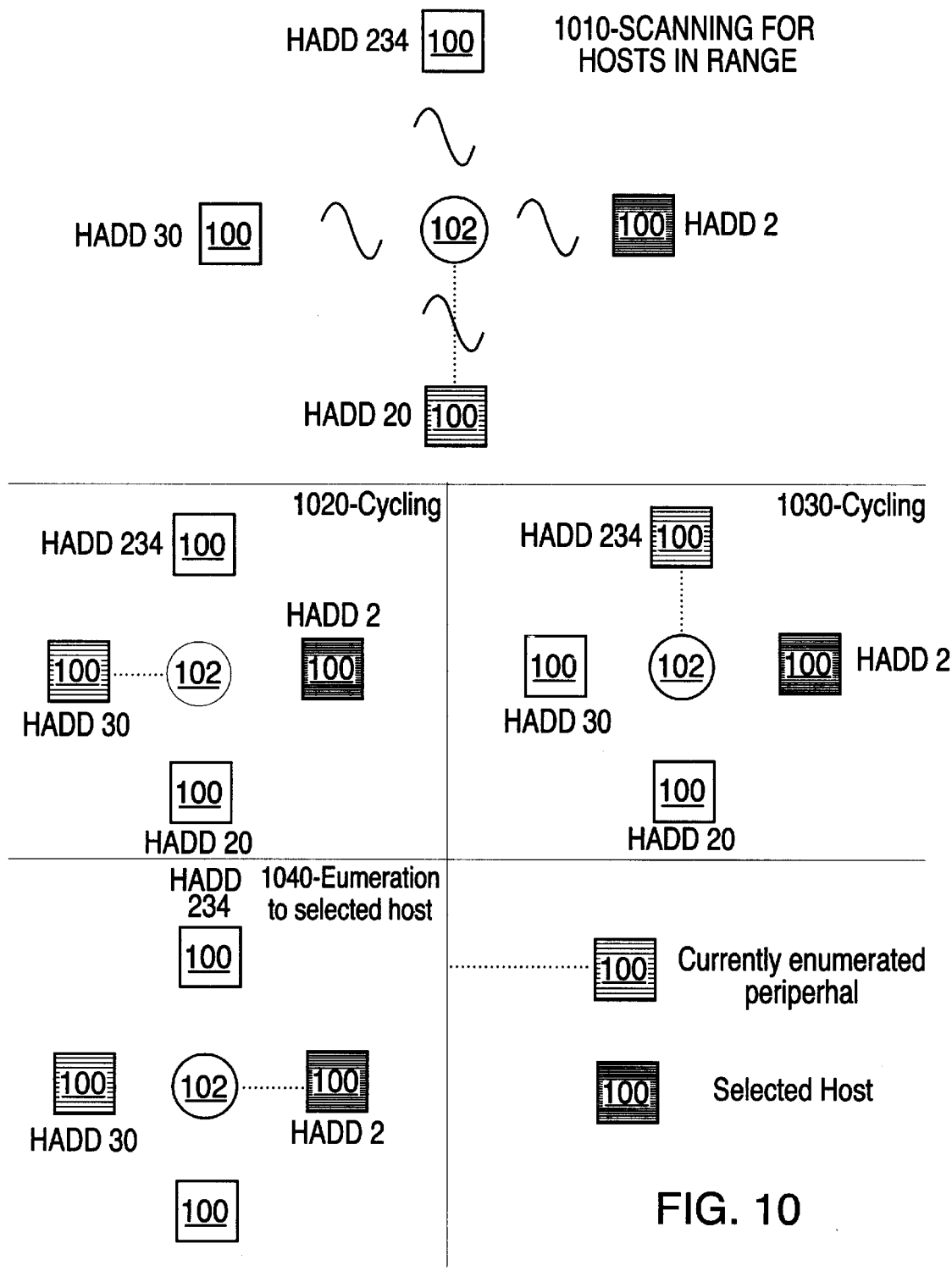
FIG. 10 depicts a typical scenario in which a peripheral device becomes enumerated to a selected host device according to the procedure outline in FIG. 9.

FIG. 10 depicts a typical situation illustrating the procedure outlined in FIG. 9. Peripheral device 102 stores the HADD of the host device 100 it seeks to establish communications with. At the initial condition, peripheral device 102 is enumerated to host 100 holding HADD 20 and seeks to become enumerated to host 100 holding HADD 2. First, peripheral 102 listens for all hosts 100 in its range to generate a list of host identifiers (HADDs) of hosts 100 available for communication (step 1610). Next, peripheral 102 establishes communications with the host holding the HADD succeeding the HADD of the host 100 it is currently communicating with (i.e. HADD 20–HADD 30 ) (step 1020). Peripheral 102 then establishes communications with host 100 holding succeeding HADD 234 (step 1030). Finally, the peripheral 102 establishes communication (becomes enumerated to) with the selected host 100 (HADD 2) (step 1040).

Various changes in the materials, components, circuit elements, as well as the details of the illustrated operational methods are possible without departing from the scope of the claims. The mechanism for a peripheral device 102 to establish communications with a selected host 100 may be embodied in a single hardware device such as a printed circuit board comprising discrete logic, integrated circuits or specifically designed application specific integrated circuits (ASIC). In addition, method steps in accordance with FIG. 9 may be performed by a computer processor executing instructions organized into a program module or a custom designed state machine. Storage devices suitable for tangibly embodying computer program instructions include all forms of non-volatile memory, including, but not limited to: semiconductor memory devices such as EPROM, EEPROM, and flash devices; magnetic disks (fixed, floppy, and removable); other magnetic media such as tape; and optical media such as CD-ROM disks.

What is claimed is:

1. A method to detect and initiate communications with a selected device comprising:
    (a) retrieving a device identifier of a current communicating device;
    (b) generating an ordered list of device identifiers for devices indicating their availability for communication; and,
    (c) starting with the current communicating device, detecting and initiating communications with each succeeding device in said ordered list until communications have been established with a selected device.

2. The method of claim 1, wherein said communication occurs over a wireless communication channel.

3. The method of claim 2, wherein said wireless communication channel is an infrared communication channel.

4. The method of claim 1, wherein said selected device is a host device.

5. The method of claim 1, wherein said selected device is a peer device.

6. The method of claim 1, wherein (a) comprises reading a variable from computer memory storing the value of the device identifier of the current communicating device.

7. A method to detect and initiate communications with a selected device comprising:
    retrieving a device identifier of a current communicating device;
    initializing an ordered list in computer memory to store device identifiers of devices indicating their availability for communication;
    for a fixed period of time, receiving messages from devices;
    upon receipt of a message from a device indicating its availability for communication, recording the device identifier of said device in said ordered list;
    starting with the current communicating device, detecting and initiating communications with each succeeding device in the ordered list until communications have been established with a selected device.

8. The method of claim 1, wherein (c) comprises:
    (c-1) storing a variable corresponding to the device identifier of the selected device;
    (c-2) reading from said ordered list a device identifier succeeding the device identifier of the current communicating device;
    (c-3) initiating communications with a device holding device identifier succeeding the device identifier of the current communicating device such that said device becomes the current communicating device;
    (c-4) updating the value of the current communicating device to reflect the device identifier of the device communications were initiated with in (c-3);
    (c-5) repeating (c-2) and (c-4) until the selected device has been detected and communications initiated therewith.

9. The method of claim 1, wherein (c) comprises:
    (c-1) reading from said ordered list, a device identifier of that device holding device identifier succeeding the device identifier of the current communicating device;
    (c-2) initiating communications with a device holding device identifier succeeding the device identifier of the current communicating device such that said device becomes the current communicating device;
    (c-3) storing the value of the device identifier of the current communicating device.

10. A program storage device, readable by a computer system, comprising: instructions stored thereon for causing the computer system to:
    (a) retrieve a device identifier of a current communicating device;
    (b) generate an ordered list of device identifiers for devices indicating their availability for communication;
    (c) starting with the current communicating device, detect and initiate communications with each succeeding device in said ordered list until communications have been established with a selected device.

11. The program storage device of claim 10, wherein the instructions comprise instructions to detect and initiate communications over a wireless communication channel.

12. The program storage device of claim 11, wherein said wireless communications channel is an infrared communications channel.

13. The program storage device of claim 10, wherein said selected device is a peer device.

14. The program storage device of claim 10, wherein said selected device is a host device.

15. The program storage device of claim 10, wherein the instructions to retrieve the current communicating device identifier comprise instructions for reading a variable from computer memory storing the value of a device identifier of the current communicating device.

16. A program storage device readable by a computer system, including instructions for causing a computer system to:
    retrieve a device identifier of a current communicating device;
    initialize an ordered list in computer memory to store the device identifiers of those devices indicating their availability for communication;
    for a fixed period of time, receive messages from devices;

upon receipt of a message from a device indicating its availability for communication, record the device identifier of said device in said ordered list;

starting with the current communicating device, initiate communications with each succeeding device in the ordered list until communications have been established with a selected device.

17. The program storage device of claim 9, wherein the instructions for detecting and initiating communications with each succeeding device in said ordered list until communications have been established with a selected device comprise instructions for:

(c-1) reading from said ordered list, a device identifier of that device holding device identifier succeeding the device identifier of the current communicating device;

(c-2) initiating communications with said succeeding device;

(c-3) repeating (c-1) and (c-2) until the selected device has been detected and communications intitiated therewith.

18. An apparatus to detect and initiate communications with a selected device out of a plurality of devices comprising a controller adapted to:

(a) retrieve a device identifier of a current communicating device;

(b) generate an ordered list of device identifiers for devices indicating their availability for communication; and, (c) starting with the current communicating device, detect and initiate communications with each succeeding device in said ordered list until communications have been established with a selected device.

19. The apparatus of claim 18, wherein said communication occurs over a wireless communication channel.

20. The apparatus of claim 19, wherein said wireless communication channel is an infrared communication channel.

21. The apparatus of claim 18, wherein said selected device is a host device.

22. The apparatus of claim 18, wherein said selected device is a peer device.

23. The apparatus of claim 18, said controller is further adapted to read a variable from computer memory storing a value of a device identifier of the current communicating device.

24. An apparatus to detect and initiate communications with a selected device out of a plurality of devices comprising a controller adapted to:

retrieve a device identifier of a current communicating device;

initialize an ordered list in computer memory to store the device identifiers of those devices indicating their availability for communication;

for a fixed period of time, receive messages from devices;

upon receipt of a message from a device indicating its availability for communication, record the device identifier of said device in said ordered list;

starting with the current communicating device, detect and initiate communications with each succeeding device in said ordered list until communications have been established with a selected device.

25. The apparatus of claim 24, wherein said controller is further adapted to:

store a variable corresponding to the device identifier of a selected device;

read from said ordered list a device identifier succeeding the device identifier of the current communicating device;

initiate communications with a device holding device identifier succeeding the device identifier of the current communicating device such that said device becomes the current communicating device;

store the value of the device identifier of the current communicating device.

26. An apparatus for a first device to detect and initiate communications with a selected second device comprising:

(a) a wireless device having
1) a first device controller for generating a hail message and for processing a hail response message;
2) memory for storing computer instructions and data;
3) a first transceiver coupled to the first controller for wireless transmission of hail messages and wireless reception of hail response messages; and, (b) a second wireless device having:
1) a second device controller adapted to:
store a device identifier corresponding to a current communicating device;
store a device identifier of a selected device corresponding to a device with which communication is sought;
process a hail message received from a second device;
generate a hail response message;
generate an ordered list of device identifiers of all hailing devices within a specified time period; and
initiate communications with each succeeding device in said ordered list until communication with the selected device is established;
2) a second bank of memory for storing computer instructions and data; and
3) a second transceiver coupled to the device controller for wireless reception of hail messages and wireless transmission of hail response messages.

27. The apparatus according to claim 26, wherein the first device further includes an encoder/decoder coupled between the device controller and the transceiver, and wherein the second device further includes an encoder/decoder coupled between the second controller and second transceiver.

28. The apparatus according to claim 26, wherein the first transceiver is an infrared transceiver and the second transceiver is an infrared transceiver.

29. The apparatus according to claim 26, wherein the first device is a host device and the second device is a peripheral device.

30. The apparatus according to claim 26, wherein the first and second wireless devices are peer devices that operate in a master/slave relationship on a permanent basis.

31. The apparatus according to claim 26, wherein the first and second wireless devices are peer devices that operate in a master/slave relationship on a transient basis.

* * * * *